United States Patent
Hirasaka

[19]

[11] Patent Number: 6,124,997
[45] Date of Patent: *Sep. 26, 2000

[54] DATA REPRODUCING APPARATUS EQUIPPED WITH ADAPTIVE PROCESSING CIRCUIT

[75] Inventor: Hisato Hirasaka, Tokyo, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/810,297

[22] Filed: Mar. 3, 1997

[30] Foreign Application Priority Data

Mar. 5, 1996 [JP] Japan ..................... 8-073031

[51] Int. Cl.$^7$ ............... G11B 5/035; H03H 7/30
[52] U.S. Cl. ............... 360/65; 360/53; 375/232
[58] Field of Search ............. 360/53, 65, 46, 360/31; 375/232

[56] References Cited

U.S. PATENT DOCUMENTS 5,481,564  1/1996  Kakuishi et al. ............ 375/230
5,703,855  12/1997  Kirino et al. ............ 369/44.32
5,796,535  8/1998  Tuttle et al. ............ 360/61
5,835,666  11/1998  Godha et al. ............ 360/65

FOREIGN PATENT DOCUMENTS

0527017A1  2/1993  European Pat. Off. ........ G11B 5/035
358107714A  6/1983  Japan .

*Primary Examiner*—Paul Loomis
*Assistant Examiner*—Regina Y. Neal
*Attorney, Agent, or Firm*—Jay H. Maioli

[57] ABSTRACT

In a data reproducing apparatus compatibility among plural recording media can be improved. In the data reproducing apparatus, the latest tap coefficient is stored as a tap coefficient in a transversal filter during the normal reproducing operation. This latest tap coefficient is used as an initial value during next reproducing operation. Accordingly, a capture operation for the reproducing operation can be quickly executed. Thus, even when a plurality of recording media are replaced and reproduced in this data reproducing apparatus, a difference between the characteristics of the recording media can be absorbed.

7 Claims, 4 Drawing Sheets

DATA REPRODUCING APPARATUS EQUIPPED WITH ADAPTIVE PROCESSING CIRCUIT

BACKGROUND OF THE INVENTION

1. Field of the Invention

The present invention is related to a data reproducing apparatus for reproducing data by executing a decoding process after a signal read from a recording medium has been equalizing-processed by an adaptive equalizing circuit.

2. Description of the Related Art

Various sorts of recording media such as magnetic tapes, magnetic disks, optical disks, and magneto-optical disks, and recording/reproducing apparatus capable of recording/reproducing these recording media are commercially available.

Generally speaking, in the reproducing apparatus capable of playing these recording media, the signals (RF signals) read from the reading media by the reproducing heads are equalizing-processed by way of analog equalizers and digital filters. After the equalized RF signals are binary-coded, the binary-coded signals are processed by the decoding process and the error correction process to reproduce the data.

To achieve the optimum equalizing characteristic during the reproducing operation, a so-called "adaptive type equalizing circuit" is employed in order that the optimum characteristic is automatically set in response to the input signal, considering fluctuations in the mechanical and electrical characteristics with respect to the respective recording media and recording/reproducing apparatuses. As a result, the error rate can be improved. The adaptive type equalizing circuit is constituted by, for instance, a transversal filter, and an adaptive equalizing coefficient calculating circuit for variably setting a coefficient applied to this transversal filter in response to an input (predicted error predictable from output).

However, the reproducing apparatus employing the adaptive equalizing circuit encounters the following problems.

First, when an abnormal signal is fed into the adaptive equalizing circuit provided in the reproducing apparatus, the adaptive equalizing loop is erroneously operated.

Usually, the abnormal reproducing states will occur with a relatively high probability in the reproducing apparatus. For instance, when a reproducing head is entered into an unrecorded portion on a recording medium such as a magnetic tape, when the reproducing head is returned from an unrecorded portion to a recorded portion thereof, when a large number of dropouts of reproduced information occur, or when a head lock of a magnetic head happens to occur, the RF signal read from the recording medium is brought into the abnormal state. Then, when this abnormal RF signal is entered into the adaptive equalizing circuit, this adaptive equalizing circuit would be diverged.

It should be understood that a "divergence" implies the below-mentioned phenomenon. That is, even when the following operations are repeatedly carried out and thereafter the reproducing signal is returned to the proper state, the operation cannot be returned to the optimum equalizing state. The operations are performed as follows. When the abnormal reproducing signal is inputted, the adaptive equalizing coefficient calculating circuit detects the erroneous predicted error, and then the calculation result of the erroneous predicted errors is stored in the adaptive equalizing coefficient calculating circuit. As a result, the improper tap coefficient is given to the transversal filter.

This adverse phenomenon would give great difficulties when the reproducing apparatus equipped with the adaptive equalizing circuit is realized.

For example, considering such a case that a portable recording medium is used in a DAT (digital audio tape) reproducing apparatus, this reproducing apparatus is required under good compatibility to reproduce various recording media (magnetic tapes etc) which have been recorded by various recording apparatuses. That is, even in such a case that the characteristic of the loaded recording medium, and the characteristic of the recording apparatus for recording this recording medium are greatly deviated from the standard characteristics, the reproducing operation must be carried out under better error rate.

In view of this consideration, when the adaptive equalizing circuit is employed, the equalizing characteristic is optimized, so that the error rate can be largely improved.

However, when such a recording medium is reproduced which owns a characteristic greatly deviated from the standard characteristic, the error rate immediately after the reproducing operation is commenced could not be largely improved. This is because when such a recording medium is reproduced, there is a large deviation between the target equalizing characteristic and the initial equalizing characteristic. As a consequence, the time period required while the adaptive equalizing circuit is converged into the optimum equalizing characteristic state would be prolonged.

This may cause a large drawback in such a system that starting/stopping operations of reproduction are frequently repeated, for example, a magnetic tape is used as a back-up storage of a computer.

The problems owned by the reproducing apparatus capable of reproducing the portable type recording medium have been described. A similar problem may be produced in a computer hard disk drive, namely, fixed recording media. In other words, considering such a case that the reproducing characteristic is deteriorated due to the aging aspect, there is a large deviation between the equalizing characteristic proposed by the adaptive equalizing circuit and the initial equalizing characteristic. Therefore, the time period required when the adaptive equalizing circuit is converged into the optimum equalizing characteristic condition would be prolonged, so that the function capable of improving the error rate could not be effectively realized.

Also, there are many recording media having various different characteristics even in one same sort of recording media acceptable by a reproducing apparatus. For instance, assuming now that the above-described recording media are magnetic tape media, as the presently available magnetic tape media, there are metal single layer coating type magnetic tapes, metal double layer coating type magnetic tapes, and metal vapor deposition type magnetic tapes. Then, the high frequency characteristics of these magnetic tapes are improved in this order. Therefore, considering now that the reproducing apparatus should accept various recording media having the different characteristic belonging to even the same sort of recording media, the reproducing apparatus must employ the coefficient tables different from each other, depending upon the different characteristics of the recording media, as the initial coefficients of the adaptive equalizing circuits. As a consequence, there is another problem that most of the storage regions such as an EEPROM capable of saving these coefficient tables are occupied.

SUMMARY OF THE INVENTION

The present invention has been made to solve the above-explained problems, and therefore, has an object to provide the following data reproducing apparatus, and also data recording/reproducing apparatus.

To achieve the above-described object, in accordance with an aspect of the present invention, a data reproducing apparatus wherein after a signal read out from a recording medium is equalizing-processed in an adaptive equalizing circuit, the equalized signal is decoded to reproduce data, is featured by employing: a transversal filter; a tap coefficient generator for generating a tap coefficient to be multiplied by each of the taps for constituting the transversal filter; a defined tap coefficient generator for generating a defined tap coefficient; an error amount detector for detecting an error amount contained in a reproducing signal within a preselected unit time period; and a defined tap coefficient setting unit for setting the tap coefficient of the transversal filter to the defined tap coefficient generated from the defined tap coefficient generator when the error amount detector detects that a predetermined amount, or more, of errors happens to occur.

Furthermore, according to another aspect of the present invention, a data recording/reproducing apparatus wherein after a signal read out from a recording medium is equalizing-processed in an adaptive equalizing circuit, the equalized signal is decoded to reproduce data, is featured by employing: a transversal filter; a tap coefficient generator for generating a tap coefficient to be multiplied by each of the taps for constituting the transversal filter in any case of such cases that the recording medium is mounted, every time various sorts of operation modes are executed, and the operation condition is changed; and a memory for updating a latest tap coefficient generated by the tap coefficient generator to store the updated latest tap coefficient.

BRIEF DESCRIPTION OF THE DRAWINGS

For a better understanding of the present invention, reference is made of a detailed description to be read in conjunction with the accompanying drawings, in which.

DETAILED DESCRIPTION OF THE PREFERRED EMBODIMENTS

A description will now be made such that a data reproducing apparatus with using an adaptive equalizing circuit is realized as a DAT (digital audio tape) recording/reproducing apparatus in accordance with a preferred embodiment of the present invention. It should be noted that although this example is realized as such a DAT recording/reproducing apparatus for recording and/or reproducing digitalized audio data, the inventive idea of the present invention may be similarly applied to a DAT system functioning as a data storage appliance capable of storing computer data, and with other systems using magnetic tape media, a magnetic disk system, a magneto-optical disk system, and an optical disk system.

Figure 1:
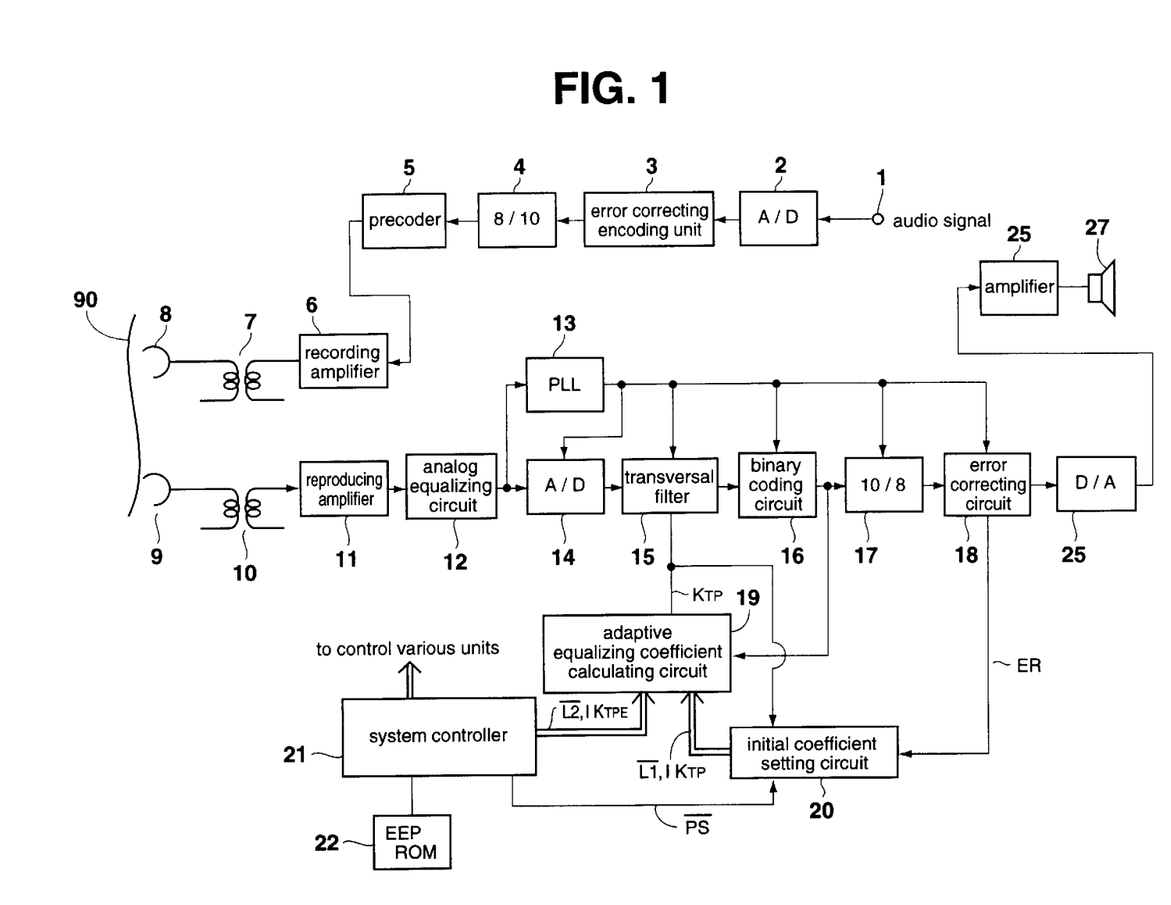
FIG. 1 is a schematic block diagram for representing an overall circuit arrangement of a data reproducing apparatus according to the present invention.

FIG. 1 is a block diagram for schematically showing an overall arrangement of a DAT (digital audio tape) recording/reproducing apparatus for recording and/or reproducing an audio signal with respect to a magnetic tape.

An analog audio signal which will be recorded on the magnetic tape is inputted from a terminal 1, and then is converted into digital audio data by an A/D converter 2. Then, an error correction code is added to this digital audio data every preselected data unit in an error correction encoding unit 3 to thereby produce digital data formed in a recording format. This digital data is processed in an 8-10-modulating unit (eight-to-ten modulating unit) 4 to be converted into a recording signal. Then, the recording signal is supplied via a precoder 5 to a recording amplifier 6. It should be understood that since the DC component contained in this recording signal is blocked by a rotary transformer 7 provided subsequent to the recording amplifier 6, the 8-10 modulation corresponding to the coding rule excluding the DC component is introduced. The precoder 5 corresponds to, for instance, a precoder operated in the class 1 partial response (PR(1,1)).

The recording signal amplified by the recording amplifier 6 is supplied through the rotary transformer 7 to a recording head 8 provided in a rotary head 8, and then the magnetic recording operation is carried out with respect to a traveled magnetic tape 90 by using the rotary head 8.

Although not shown in detail in FIG. 1, the magnetic tape 90 is traveled an inclined condition along a height direction while this magnetic tape 90 is wound around the rotary drum at a predetermined angle, on which the magnetic head 8 is mounted. This rotary drum is rotated while being slid on the magnetic tape 90. As a result, the recording tracks are formed on the magnetic tape 90 by way of a so-called "helical scanning" method.

During reproducing operation, the magnetic tape 90 wound on the rotary drum is traveled and this rotary drum itself is rotated, so that reproducing head 9 mounted on the rotary drum may trace the recording tracks to read out the recorded data from the recording tracks.

It should also be noted that although only one recording head 8 and only one reproducing head 9 are represented in FIG. 1, two sets of these recording heads and two sets of these reproducing heads, whose azimuth angles are different from each other, are actually arranged on the circumferential surface of the rotary drum under such a condition that these heads are separated from each other at a predetermined angle. This is because the azimuth beta recording system has been employed. There are various actual cases, e.g., two sets of recording heads in combination with two sets of reproducing heads; two sets of recording/reproducing heads; and a single recording/reproducing head in combination with a single recording head and a single reproducing head.

The signal read by the reproducing head 9 is supplied via another rotary head 10 to a reproducing amplifier 11. It should be noted that both the recording rotary transformer 7 and the reproducing rotary transformer 10 may be commonly constructed of a single rotary transformer.

The signal amplified by the reproducing amplifier 11 is equalized by an analog equalizing circuit 12, and then the equalized signal is supplied to a PLL (phase-locked loop) circuit 13 and an A/D converter 14. The analog equalizing circuit 12 is arranged as a general-purpose analog equalizer. This analog equalizer is equipped with an integral circuit having an integral characteristic with respect to the low frequency signal components used to compensate for the differential characteristic owned by the reproducing head 9; a differential circuit having a differential characteristic with respect to the high frequency signal components used to compensate losses caused by the gap of the reproducing head 9; a low-pass filter for passing only the signal having the required frequency range; and a phase equalizer for changing the phase without changing the amplitude used to correct the phase rotation by this low-pass filter.

The PLL circuit 13 produces the reproducing clock signal in synchronization with the signal outputted from the analog equalizing circuit 12, and supplies this reproducing clock signal to an A/D converter 14, a transversal filter 15, a binary coding circuit 16, a 10-8 converting unit 17, and an error correcting unit 18 as an operation clock signal.

The analog signal from the analog equalizing circuit 12 is converted into digital data by the A/D converter 14, and thereafter this digital data is entered into the tranversal filter 15. This transversal filter 15 executes a filtering process based upon a coefficient "$K_{TP}$" generated by an adaptive equalizing coefficient calculating circuit 19 with respect to this digital data, and then outputs the filtered data to the binary coding circuit 16.

The adaptive equalizing coefficient calculating circuit 19 adaptively produces the tap coefficient "$K_{TP}$" based on the output data from the binary coding circuit 16 so as to control the filtering process operation of the transversal filter 15. An adaptive equalizing circuit constituting a major portion of the present invention is arranged by this transversal filter 15, the adaptive equalizing coefficient calculating circuit 19, an initial coefficient setting circuit 20, and a system controller 21, which will be discussed later.

In the tranversal filter 15, the equalization errors remaining in the signal appearing at the output stage of the analog equalizing circuit 12 are minimized. To achieve this error minimization, the equalization characteristic is adaptively set to the optimum condition based upon the tap coefficient $K_{TP}$ supplied from the adaptive equalizing coefficient calculating circuit 19.

In the binary coding circuit 16, the input signal is binary-coded. The binary-coded signal is supplied to the 10-8 converting unit 17. The 10-8 converting unit 17 performs a decoding operation with respect to the 8-10-modulation executed during the recording operation. After the decoded data is error-corrected by the error correcting circuit 18, the error-corrected data is converted into an analog signal by the D/A-converter 25. Namely, the original analog audio signal is obtained. Then, this audio signal is amplified by an amplifier 26 and then is produced as an audio output from a speaker 27.

The error correcting unit 18 outputs error amount information ER acquired when the error correction process is carried out into the initial coefficient setting circuit 20.

The initial coefficient setting circuit 20 is so constructed so that this initial coefficient setting circuit 20 can set an initial value "$IK_{TP}$" of the tap coefficient "$K_{TP}$" when the adaptive equalizing process is carried out with respect to the adaptive equalizing coefficient calculating circuit 19.

The system controller 21 is constructed of a microcomputer capable of controlling the entire data recording/reproducing apparatus. That is, the system controller 21 controls the tape travel operation, and the DAT recording/reproducing operation by the recording head 8 and the reproducing head 9, and other operations.

In an EEP-ROM (electrically erasable programmable read-only memory)22, for instance, the initial value $IK_{TPE}$ of the tap coefficient set during adjustment operations of a manufacturing process in a factory is saved. The system controller 21 sets this initial value $IK_{TPE}$ to the adaptive equalizing coefficient calculating circuit 19, if required, as the initial tap coefficient $K_{TP}$ during the adaptive operation.

The tap coefficient $K_{TP}$ is adaptively set into the transversal filter 15 by the adaptive equalizing coefficient calculating circuit 19.

In other words, the adaptive equalizing coefficient calculating circuit 19 sequentially varies and adaptively sets the tap coefficient $K_{TP}$ in order to realize a so-called "automatic equalizing operation". To execute this adaptive setting operation, the output signal derived from the transversal filter 15 (namely, output signal from binary coding circuit 16) is utilized. Then, a prediction error is calculated from this output signal of the transversal filter 15, and thus the tap coefficient $K_{TP}$ is adjusted in order to reduce this prediction error as small as possible. This process operation will now be explained as follows:

First, it is now assumed that a transmit data series is w(n), and an impulse response series of a signal transmission path is g(n). In the DAT recording/reproducing apparatus of FIG. 1, the transmit data series corresponds to the recording signal, whereas the signal transmission path corresponds to a path defined from the recording amplifier 6 to the input of the A/D converter 14.

Assuming now that such an input signal series is "q(n)" which corresponds to a signal obtained by sampling an RF signal entered into the transversal filter 15 at the clock timing, since this input signal series q(n) is equal to a convolution integration of the transmission series w(n) and the impulse response series g(n) of the transmission path, it is expressed by the following formula (1):

$$q(n) = \sum_{m=-\infty}^{\infty} q(n-m)w(m). \tag{1}$$

Also, assuming now that the tap coefficient $K_{TP}$ of the transversal filter 15 is expressed as "ck(n)", and also symbol "K" denotes a tap number, since an output "v(n)" of the transversal filter 15 is equal to a convolution integration of the input signal series q(n) and the tap coefficient ck(n), it becomes the formula (2) as follows:

$$v(n) = \sum_{k=0}^{k-1} C_k(n)q(n-k). \tag{2}$$

When this formula (2) is substituted for the formula (1), the below-mentioned formula (3) is obtained:

$$\begin{aligned} v(n) &= \sum_{k=0}^{k-1} C_k(n) \sum_{m=-\infty}^{\infty} q(n-m-k)w(m) \\ &= \sum_{m=-\infty}^{\infty} \sum_{k=0}^{k-1} C_k(n)q(n-k-m)w(m). \end{aligned} \tag{3}$$

It should be noted that although the summation of this formula (3) is defined from "$-\infty$" to "$+\infty$", while recognizing the impulse response length of the transmission path as the infinite, this length is actually finite.

Next, a difference between the transmit data series w(n) and the output v(n) of the transversal filter 15, namely an error e(n) is calculated as follows:

$$e(n) = w(n) - v(n) \quad (4).$$

A theoretical error is calculated based on this formula (4). However, in practice, there is no such time when the transmit data series w(n) is previously known except for a special case. Practically, a predicted transmit series w(n)' is produced based on a provisional detection result of the output v(n), and then is utilized in the calculation of the predicted result E (n)'. That is, this predicted error e(n)' is calculated by the formula (5) as follows:

$$e(n)' = w(n)' - v(n) \quad (5).$$

Accordingly, the adaptive equalizing coefficient calculating circuit 19 may optimize the equalizing characteristic by adjusting the tap coefficient of the transversal filter 15 in order to reduce this predicted error e(n)' as small as possible.

Figure 2:
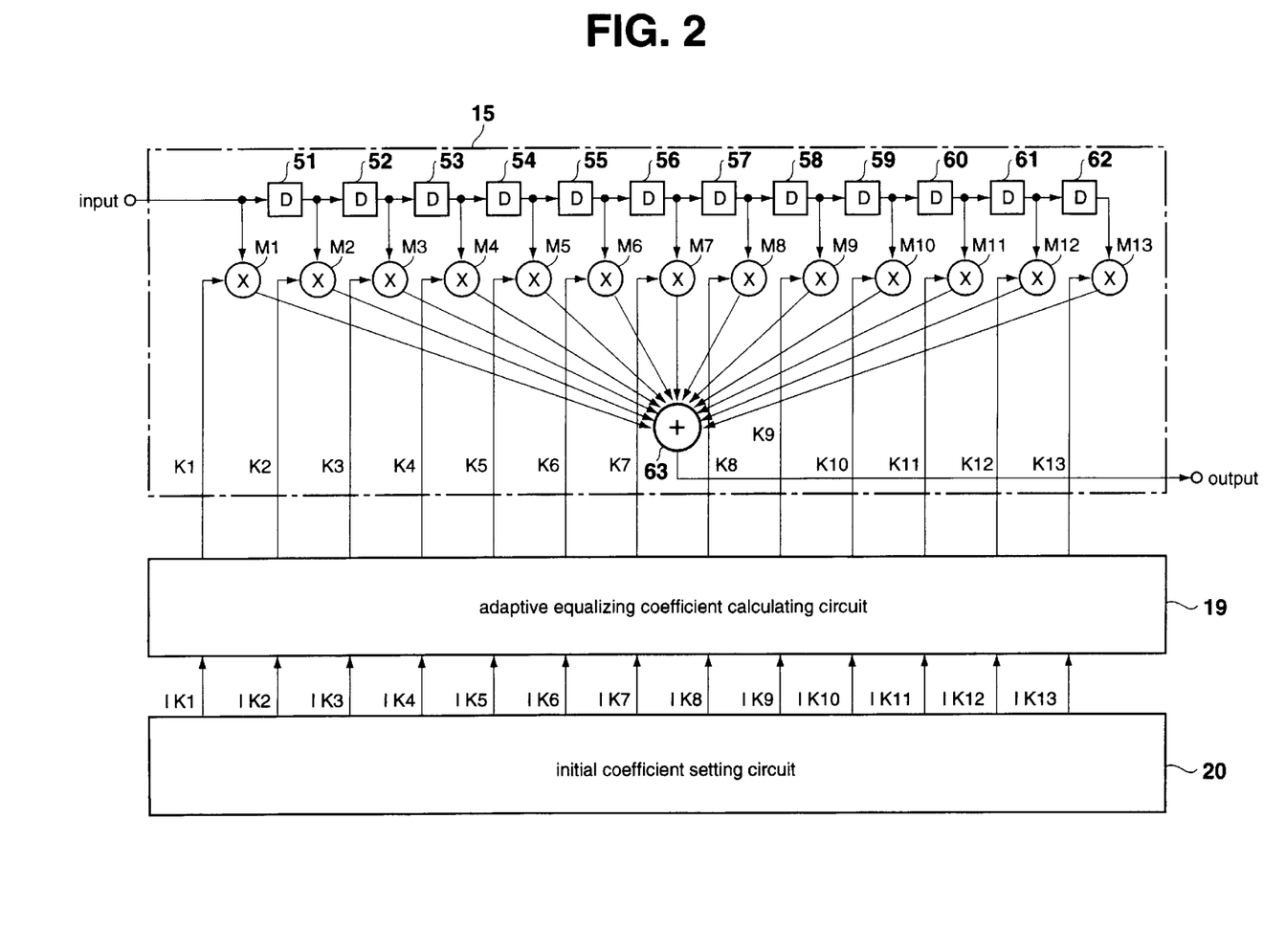
FIG. 2 is a schematic block diagram for showing an internal circuit arrangement of a transversal filter adapted to the data reproducing apparatus according to the present invention.

FIG. 2 represents a structure of the transversal filter 15. This transversal filter 15 is constituted as an FIR filter having 13 stages or taps and formed by delay circuits 51 to 62, coefficient multipliers M1 to M13, and an adder 63. Then, the adaptive equalizing coefficient calculating circuit 19 produces the tap numbers K1 to K13 corresponding to the coefficient multipliers M1 to M13 based on the above-described adaptive calculation, so that the adaptive equalizing apparatus can be realized.

Figure 3:
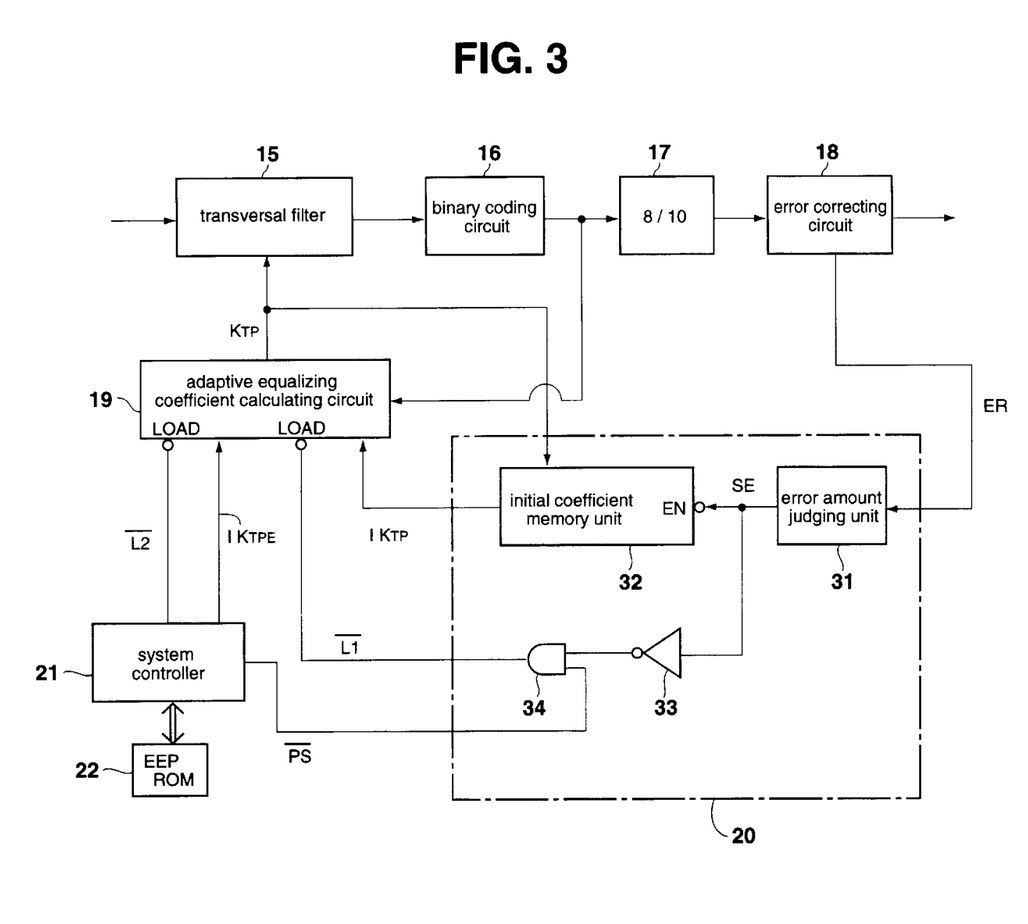
FIG. 3 is a schematic block diagram for indicating an adaptive equalizing coefficient calculating circuit of a first embodiment for updating a tap coefficient of the transversal filter adapted to the data reproducing apparatus of the present invention.

A major circuit arrangement of the present invention is indicated in FIG. 3.

As shown in this drawing, the initial coefficient setting circuit 20 is arranged by an error amount judging circuit 31, an initial coefficient memory circuit 32, an inverter 33, and an AND gate 34.

The error amount information ER outputted from the error correcting unit 18 is inputted into the error amount judging unit 31. The error amount judging unit 31 measures the error amount based upon the error amount information ER every preselected time period. For instance, the error amount is measured in units of 1 track of the reproducing data on the magnetic tape 90, and this measurement value is compared with the reference value. As a result of this comparison, the error amount judging unit 31 judges whether the error occurrence frequency is present within the allowable range under normal reproducing state, or is recognizable as an abnormal reproducing state.

The error amount judging unit 31 produces, for instance, an output signal SE with an "L" level when it is judged as the normal reproducing state, and also produces another output signal SE with an "H" level when it is judged as the abnormal reproducing state. This output signal SE may function as an enable signal with respect to the initial coefficient memory unit 32. The initial coefficient memory unit 32 is arranged by a so-called "RAM". The tap coefficient $K_{TP}$ corresponding to the output signal from the adaptive equalizing coefficient calculating circuit 19 is supplied as data to be written into this initial coefficient memory unit 32.

Then, in the time period during which the error occurrence frequency is judged as the normal reproducing state and thus the signal SE, namely the enable signal becomes the "L" level, the tap coefficient $K_{TP}$ outputted from the adaptive equalizing coefficient calculating circuit 19 is written into the initial coefficient memory unit 32. In other words, while reproducing the data under normal condition, the adaptive equalizing coefficient calculating circuit 19 properly updates the tap coefficient $K_{TP}$ until its convergence to output the updated tap coefficient $K_{TP}$ to the transversal filter 15. This tap coefficient $K_{TP}$ is sequentially written into the initial coefficient memory unit 32. As a consequence, the latest tap coefficient $K_{TP}$ under normal reproducing state is continuously saved in the initial coefficient memory unit 32. The stored tap coefficient $K_{TP}$ is recognized as an initial value of tap coefficient "$IK_{TP}$".

Also, the signal SE from the error amount judging unit 31 is inverted by the inverter 331 and the inverted signal is supplied to one input of the AND gate 34.

An operation state change signal PS derived from the system controller 21 is supplied to the other input of the AND gate 34.

This operation state change signal PS is such a signal having an "L" level produced from the system controller 21 only in a predetermined time period when the following operation changes happen to occur.

That is, when the reproducing operation is commenced, when the recording operation (i.e., recording operation during which recording operation check is done by reproducing data at the same time when recording operation is carried out) is commenced, when the fast-forward searching operation is commenced, and when the rewind searching operation is commenced, this signal with the "L" level is produced. In other words, when all of the operations in conjunction with the data reading operation for the magnetic tape 90 are commenced, the signal with the "L" level is produced during a preselected time period.

The output "L1" of the AND gate 34 is used as a load signal of the adaptive equalizing coefficient calculating circuit 19, and then this adaptive equalizing coefficient calculating circuit 19 loads the tap coefficient stored in the initial coefficient memory unit 32 in response to the load signal L1, namely loads the initial value "$IK_{TP}$" of the tap coefficient.

In other words, within the time period during which the operation state change signal PS becomes "L" level (will be referred to as a "during operation state change" hereinafter), or during which the error amount judging unit 31 judges it as the abnormal reproducing state, the adaptive equalizing coefficient calculating circuit 19 loads the initial value $IK_{TP}$ from the initial coefficient memory unit 32.

Also, this major circuit arrangement is constructed in such a manner that both a load signal "$\overline{L2}$" and a fixed initial value "$IK_{TPE}$" are supplied from the system controller 21 to the adaptive equalizing coefficient calculating circuit 19. As previously described, the fixed initial value $IK_{TPE}$ corresponds to the initial value of the tap coefficient stored in the EEP-ROM 22, which has been set during the adjustment work of the product manufacturing stage. The system controller 21 causes the adaptive equalizing coefficient calculating circuit 19 to load the tap coefficient in response to the load signal L2, and also outputs the initial value $IK_{TPE}$ read from the EEP-ROM 22 to the adaptive equalizing coefficient calculating circuit 19, so that this initial value $IK_{TPE}$ can be set to the adaptive equalizing coefficient calculating circuit 19.

Now, a description will be made of various operations of the first DAT recording/reproducing apparatus with employment of the above-described circuit arrangement, namely during the normal reproducing operation, during the operation state change, during the abnormal reproducing operation, and during the first reproducing operation (i.e., first reproducing operation after power supply is turned ON, and after recording tape is replaced).

DURING NORMAL REPRODUCING OPERATION

During the normal reproducing operation, namely when there is no problem in the error rate, the output signal SE of the error amount judging circuit 31 becomes "L". As a result, the initial coefficient memory unit 32 executes the writing operation, during which the tap coefficient $K_{TP}$ produced from the adaptive equalizing coefficient calculating circuit 19 is fetched as a sequential initial value $IK_{TP}$ into the initial coefficient memory unit 32. As a consequence, the latest tap coefficient $K_{TP}$ during the normal reproducing operation is continuously saved as the initial value $IK_{TP}$ into the initial coefficient memory unit 32.

DURING OPERATION STATE CHANGE

During the operation state change, namely during the reproduction commencement, in a time period during which the operation state change signal PS becomes "L" level, the adaptive equalizing coefficient calculating circuit 19 loads the initial value $IK_{TP}$ saved in the initial coefficient memory unit 32, and then supplies this initial value $IK_{TP}$ as a first tap coefficient $K_{TP}$ to the transversal filter 15.

FIG. 2 illustrates operation images during this operation state change. As the initial value $IK_{TP}$ saved in the initial coefficient memory unit 32, the coefficient initial values IK1 to IK13 corresponding to the respective taps are set to the adaptive equalizing coefficient calculating circuit 19. Then, the adaptive equalizing coefficient calculating circuit 19 supplies each of these coefficient initial values IK1 to IK3 as the first tap coefficients K1 to K13 to the respective multipliers M1 to M13.

After a preselected time period has passed, and the operation state change signal PS becomes "H" level, the adaptive equalizing coefficient calculating circuit 19 changes the tap coefficients K1 to K13 produced based on the above-described adaptive calculation, so that the transversal filter 15 is converged into the optimum equalizing characteristic condition. It should be noted the operation of the initial coefficient setting circuit 20 at this time is returned to the above-explained normal reproducing operation.

During the operation state change, the initial value $IK_{TP}$ saved in the initial coefficient memory unit 32, namely the optimum value produced during the preceding operation is employed as the first tap coefficients K1 to K13. This value corresponds to such a value capable of realizing the equalization characteristic coincident with the characteristic of the magnetic tape 90 at this time. Accordingly, since the initial value $IK_{TP}$ is employed, the adaptive equalizing operation is very quickly converged during the operation state change.

DURING ABNORMAL REPRODUCING OPERATION

When the operation is brought into the abnormal reproducing operation, namely in a time period during which the error rate is deteriorated in the reproducing operation, the operation state change signal SE becomes "H" level. As a result, the writing operation of the tap coefficient $K_{TP}$ by the initial coefficient memory unit 32 is stopped. As a consequence, the value of the initial value $IK_{TP}$ saved in the initial coefficient memory unit 32 is fixed to such a value of the tap coefficient $K_{TP}$ obtained immediately before the error rate is deteriorated and then the operation is judged as the abnormal reproducing state.

Also, the H-leveled operation state change signal SE is processed by the inverter 33 and the AND gate 34 to function as a load signal for the adaptive equalizing coefficient calculating circuit 19. In response to this load signal, the adaptive equalizing coefficient calculating circuit 19 loads the initial value $IK_{TP}$ saved in the initial coefficient memory unit 32. Then, this initial value $IK_{TP}$ is supplied as the tap coefficient $K_{TP}$ to the transversal filter 15.

This condition is continued during such a time period that the operation is judged as the abnormal reproducing operation. In other words, the tap coefficient $K_{TP}$ from the adaptive equalizing coefficient calculating circuit 19 is fixed to the initial value $IK_{TP}$ (namely, value of tap coefficient $K_{TP}$ produced immediately before it is judged as abnormal reproducing state), and therefore no coefficient correction by the adaptive calculation is carried out. This is because the load signal continuously functions during the abnormal reproducing operation, and thus the initial value $IK_{TP}$ is forcibly applied to the adaptive equalizing coefficient calculating circuit 19.

As a consequence, it is possible to prevent the adaptive equalizing operation from being diverged by receiving the unstable input caused by the abnormal reproducing state.

Then, since the initial value $IK_{TP}$ is continuously set as tap coefficient $K_{TP}$, when the reproducing signal is returned to the normal state, the normal reproducing signal can be traced without any delay, and thus the adaptive equalizing operation can be immediately returned to the convergence stable condition.

It should also be noted that when the reproducing operation is returned from this abnormal reproducing state to the normal reproducing state and the operation state change signal becomes "L" level, the operation of the initial coefficient setting circuit 20 may be returned to the above-explained operation during the normal reproducing operation.

FIRST REPRODUCING OPERATION

The first reproducing operation after turning ON the power supply, and the first reproducing operation after replacing the magnetic tape are exceptional operations other than the above-described normal reproducing operation, operation state change, and abnormal reproducing operation.

In a case that a certain magnetic tape 90 is first reproduced, and an initial value of an optimum tap coefficient corresponding to this magnetic tape 90 is unknown to any operators, that is, since no reproducing operation is carried out for this magnetic tape 90, the optimum initial value $IK_{TP}$ is not saved in the initial coefficient memory unit 32.

Under such a circumstance, the system controller 21 outputs the initial value $IK_{TPE}$ saved in the EEP-ROM 22 and the load signal L2 to the adaptive equalizing coefficient calculating circuit 19 so as to use the initial value $IK_{TPE}$ as the first tap coefficient $K_{TP}$.

After the reproducing operation is commenced by employing the initial value $IK_{TPE}$ as the tap coefficient $K_{TP}$, this reproducing operation is advanced to the operation state during the above-explained normal reproducing operation.

In the DAT reproducing/recording apparatus capable of realizing the above-described operations, during the operation state change, namely when the recording operation is commenced in connection with the reproducing operation, the fast reproducing operation, the rewind reproducing operation, and the reading operation, while the latest optimum tap coefficient value is used as the initial value, the adaptive equalizing operation is carried out. As a result, the adaptive equalizing operation can be very quickly converged, so that the error rate and the reproduction reliability can be improved. Since the initial value $IK_{TP}$ is set to the optimum value corresponding to the characteristic of the magnetic tape 90 at this time, the time required for the convergence becomes not so long even in such a magnetic tape whose characteristic is considerably different from the standard characteristic. Further, the compatibility performance can be considerably increased.

Furthermore, since the initial value $IK_{TP}$ is the latest optimum value, deterioration of the error rate caused by the adverse influences by the aging change can be solved.

Also, during the abnormal reproducing operation when the error rate is deteriorated, the adaptive operation is interrupted and the tap coefficient $K_{TP}$ to be supplied to the transversal filter 15 is fixed to the definition value (in this embodiment, initial value $IK_{TP}$ is used as definition value). As a consequence, there is no risk that the adaptive equalizing circuit is not diverged by receiving the abnormal signal. After being recovered from the abnormal state, the adaptive equalizing operation is immediately converged to be brought into the stable condition. As a consequence, the error rate may be increased, the reliability may be increased, and the compatibility performance may be improved.

In addition, in this case, although the initial value $IK_{TP}$ is such a value produced during the normal reproducing operation, there is no need to previously save a plurality of initial values corresponding to various sorts of magnetic tapes 90 in advance. As a result, the storage capacity of the EEP-ROM can be reduced.

While the present invention has been described the above-explained preferred embodiments, the present invention is not limited thereto, but may be modified.

Figure 4:
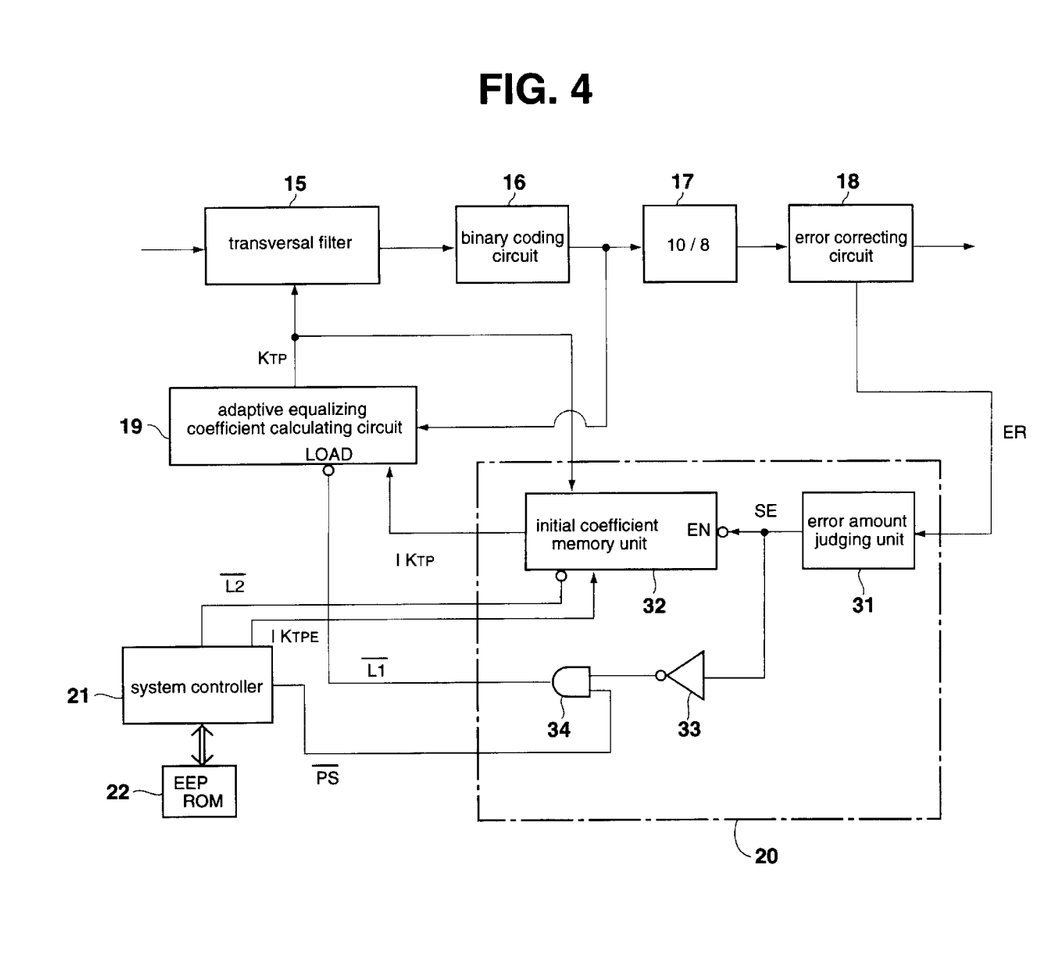
FIG. 4 is a schematic block diagram for representing an adaptive equalizing coefficient calculating circuit of a second embodiment.

For instance, FIG. 4 is one modified circuit as to the major circuit of FIG. 3. In this example, the load signal L2 derived from the system controller 21 and the initial value $IK_{TPE}$ saved in the EEP-ROM 22 are outputted to the initial coefficient memory unit 32. That is, when the reproducing operation is initially carried out after turning ON the power supply, and also when the reproducing operation is initially carried out after replacing the magnetic tape, the initial value $IK_{TPE}$ is set to the initial coefficient memory unit 32. At this time, the operation state change signal PS is brought into "L" level, so that the initial value $IK_{TPE}$ set to the initial coefficient memory unit 32 is loaded on the adaptive equalizing coefficient calculating circuit 19. The operation functions of this modified circuit are similar to those of the above-described embodiment.

In the above embodiment, the error amount monitored by the error amount judging unit 31 is determined every data period for 1 track. This error amount is suitable for such a case that the two reproducing heads having the reverse azimuth angles are switched, and the respective reproducing heads correspond to every second track as in the DAT reproducing apparatus. However, the present invention is not limited to this case. Alternatively, in reproducing apparatuses adaptable to such recording media, e.g., a CD (compact disk), and a hard disk for a computer, an error amount may be properly selected.

It should be understood that this proper time period should be properly fitted to the changed period of the tap coefficient. This is because the system may evaluate the error amount before changing the tap coefficient.

Various sorts of level setting judgments may be conceived so as to judge whether or not the abnormal reproducing state occurs by checking the level of the error amount in the error amount judging unit 31. For example, it is possible to judge that the abnormal reproducing state happens to occur when all data recorded on a single track are detected as error data. Alternatively, it is also possible to judge that abnormal reproducing state happens to occur when all data recorded on a ½, or ¼ or more track are detected as error data.

Also, the judging standards for the abnormal reproducing operation must be properly set, depending on the system under use. For example, in such a case that a recording medium is fixed as in a hard disk drive, the strict judging standard is introduced in such a manner that even when a small number of errors happens to occur, the tap coefficient is fixed to the definition value. Alternatively, the judging standard may be relaxed in order that various recording media having various characteristics can be accepted in reproducing apparatuses with using portable recording media.

As the definition value used during the abnormal reproducing operation, the initial value $IK_{TP}$ has been employed in the above-described embodiment, but any other values may be employed. For instance, assuming now that the transfer function of the transversal filter 15 is selected to be 1, this definition value of the tap coefficient is set to this value. Then, the system controller 21 may set this value to the adaptive equalizing coefficient calculating circuit 19. This tap coefficient definition value where the transfer function is selected to be 1 implies that the tap coefficients K1 to K13 are "0000001000000" as to the transversal filter 15 having 13 taps shown in FIG. 3. That is, the tap coefficient of the center tap of this transversal filter 15 is selected to be 1, and the tap coefficients of other taps are selected to be 0.

Furthermore, the initial value $IK_{TPE}$ saved in the EEP-ROM 22 may be employed as the definition value.

Also, in the above-explained embodiment, the error information ER has been used so as to detect the abnormal reproducing state. Alternatively, other detecting methods may be realized. For instance, the abnormal reproducing state may be detected from the RF signal voltage, the frequency characteristic of the RF signal, the dropout amount of data, and the servo locking state (servo error times). Apparently, any combinations of these items may be employed so as to detect the abnormal/normal reproducing operations.

It should be understood that when the above-described abnormal reproduction judgment is carried out based on the error information ER, namely, the error detection result, the overall circuit arrangement can be best made simplest without requiring any additional interface, and further the highest reliability can be achieved as to the quality evaluation about the reproducing signal.

As previously described in detail, in accordance with the data reproducing apparatus of the present invention, the adaptive equalizing circuit stores the latest tap coefficient outputted from the coefficient generating means during the normal reproducing operation, and also supplies the tap coefficient stored during the operation state change to the coefficient generating means, and then sets this supplied tap coefficient as the initial value of the tap coefficient to be outputted to the transversal filter means. As a consequence, during the operation state change, for example, when the recording operation is commenced in connection with the reproducing operation, the fast reproducing operation, the rewind reproducing operation, and the reading operation, while the latest optimum tap coefficient value is used as the initial value, the adaptive equalizing operation is carried out. As a result, the adaptive equalizing operation can be very quickly converged, so that the error rate and the reproduction reliability can be advantageously improved. Even when the recording medium having the characteristic considerably different from the standard characteristic is reproduced, these effects can be of course achieved, so that the compatibility performance related to the recording medium can be improved.

Furthermore, since the initial value is the latest optimum value, deterioration of the error rate caused by the adverse influences by the aging change can be solved.

In addition, since the initial value is such a value produced during the normal reproducing operation, there is no need to previously save a plurality of initial values corresponding to various sorts of magnetic tapes 90 in advance. As a result, the storage capacity of the memory can be reduced.

Also, according to the present invention, when a preselected amount or more amount of error occurrences are detected within a predetermined unit time, the adaptive equalizing circuit supplies the defined tap coefficient is supplied to the coefficient generating means, and then the tap coefficient from the coefficient generating means to the transversal filter means is fixed to the defined tap coefficient. As a consequence, there is no risk that the adaptive equalizing circuit is not diverged by receiving the abnormal signal. After being recovered from the abnormal state, the adaptive equalizing operation is immediately converged to be brought into the stable condition. As a consequence, the error rate may be increased, the reliability may be increased, and the compatibility performance may be improved.

What is claimed is:

1. A data reproducing apparatus wherein a reproducing signal is read out from a recording medium and equalizing-processed in an adaptive equalizing circuit to produce an equalized signal, the apparatus comprising:

transversal filter means receiving the reproducing signal;

tap coefficient generating means having a first input connected to an output of the transversal filter means for generating a plurality of tap coefficients for multiplying, respectively, a plurality of taps constituting said transversal filter means;

an error correcting circuit for performing an error correcting operation and decoding the output of the transversal filter means for producing the equalized signal and for producing an error amount information signal when performing the error correcting operation;

error amount detecting means for comparing an error amount contained in the error amount information signal produced solely by the error correcting circuit within a preselected unit time period with a reference value and producing an enable signal having a first level indicating that the error amount in the error amount information signal exceeds the reference value and a second level indicating that the error amount in the error amount information signal does not exceed the reference value;

defined tap coefficient memory means having an input connected to an output of the tap coefficient generating means for storing latest tap coefficients generated by said tap coefficient generating means upon being enabled by said enabling signal when said error amount detecting means detects that the error amount does not exceed the reference value, so that the stored tap coefficients are updated based on the latest tap coefficients; and means for determining a change of operating state of the apparatus and receiving the enable signal for causing the latest tap coefficients stored in the defined tap coefficient memory means to be loaded in at a second input of the tap coefficient generating means upon determining the change of operating state and the enable signal having the second level, whereby the defined tap coefficients are fed to the transversal filter means.

2. The data reproducing apparatus as claimed in claim 1 wherein said defined tap coefficient is a latest tap coefficient obtained from said tap coefficient generating means during a normal reproducing operation.

3. The data reproducing apparatus as claimed in claim 1 wherein the defined tap coefficient is a standard value set when said data reproducing apparatus is manufactured in a factory.

4. The data reproducing apparatus as claimed in claim 1 wherein said defined tap coefficient is a tap coefficient for setting a transfer function of said transversal filter means equal to 1.

5. A data/recording/reproducing apparatus wherein a reproducing signal is read out from a recording medium and equalizing-processed in an adaptive equalizing circuit to produce an equalized signal, the apparatus comprising:

transversal filter means receiving the reproducing signal;

tap coefficient generating means having a first input connected to an output of the transversal filter means for generating a plurality of tap coefficients for multiplying, respectively, a plurality of taps constituting said transversal filter means;

defined tap coefficient storage means having an input connected to an output of the tap coefficient generating means for receiving and storing latest tap coefficients generated by said tap coefficient generating means and for, so that stored tap coefficients are updated based on the latest received tap coefficients;

an error correcting circuit for performing an error correcting operation and decoding the output of the transversal filter means for producing the equalized signal and for producing an error amount information signal when performing the error correcting operation;

error amount detecting means for comparing an error amount contained in the error amount information signal produced solely by the error correcting circuit within a preselected unit time period with a reference value and producing an enable signal having a first level indicating that the error amount in the error amount information signal exceeds the reference value and having a second level indicating that the error amount in the error amount information signal does not exceed the reference value; and means for determining a change of operating state of the apparatus, including each time the recording medium is mounted in the apparatus, every time various sorts of operation modes are executed, and each time the operation condition is changed and being connected to receive the enable signal for causing the latest tap coefficients stored in said defined tap coefficient storage means to be loaded in at a second input of said tap coefficient generating means upon determining the change of operating state of the apparatus and the enable signal having the second level, whereby the latest tap coefficients are fed to the transversal filter.

6. The data recording/reproducing apparatus as claimed in claim 5 wherein said various sorts of operation modes corresponds to any one of a reproducing operation, a recording operation, and a retrieving operation.

7. The data recording/reproducing apparatus as claimed in claim 5 wherein said operation when the operation condition is changed corresponds to one of various operations: when a reproducing head is transferred from a recording portion to an unrecorded portion; when the reproducing head is transferred from the unrecorded portion to the recording portion; when an error rate is deteriorated; and when a gap of the reproducing head is filled with dust, thereby forming a transition from a normal state to an abnormal state.

* * * * *